United States Patent [19]
Titterton et al.

[11] Patent Number: 5,744,404
[45] Date of Patent: Apr. 28, 1998

[54] CRYSTALLINE ODOR ADSORBING ZEOLITE DELIVERY SYSTEM

[75] Inventors: Michelle A. Titterton, Lake Zurich; Patricia E. Summers, Glencoe, both of Ill.

[73] Assignee: UOP, Des Plaines, Ill.

[21] Appl. No.: 752,980

[22] Filed: Dec. 2, 1996

[51] Int. Cl.$^6$ .............................. A62B 7/10; B01D 53/04
[52] U.S. Cl. .............................. 442/63; 427/244; 427/332
[58] Field of Search .............................. 442/63; 427/189, 427/244, 332

[56] References Cited

U.S. PATENT DOCUMENTS

| | | | |
|---|---|---|---|
| 4,462,981 | 7/1984 | Smith | 424/27 |
| 4,795,482 | 1/1989 | Gioffre et al. | 558/75 |
| 4,826,497 | 5/1989 | Marcus et al. | 604/359 |
| 5,084,427 | 1/1992 | Tsoucalas | 502/62 |
| 5,161,686 | 11/1992 | Weber et al. | 206/440 |
| 5,254,337 | 10/1993 | Marcus et al. | 424/76.1 |
| 5,269,294 | 12/1993 | Rogozinski | 128/205.27 |

*Primary Examiner*—Daniel Zirker
*Attorney, Agent, or Firm*—Thomas K. McBride; Eugene I. Snyder; Frank S. Molinaro

[57] ABSTRACT

Applicants have developed a process and an article for delivering or applying a zeolitic molecular sieve to an odorous surface. The process involves contacting the surface with a porous article which contains a slurry a zeolitic molecular sieve having a $SiO_2/Al_2O_3$ ratio of at least 18. The slurry also contains water, ethanol, a suspending agent, a preservative and optionally an emollient. The porous article can be woven or non-woven and includes wipes, pads, foams, towelettes, etc.

7 Claims, No Drawings

CRYSTALLINE ODOR ADSORBING ZEOLITE DELIVERY SYSTEM

FIELD OF THE INVENTION

This invention relates to a method of applying or delivering an odor absorbing crystalline zeolitic molecular sieve onto an odor containing surface. The molecular sieve is applied as a slurry to a porous article which is then contacted with the surface.

BACKGROUND OF THE INVENTION

A number of substances are odorous. When these odorous substances are absorbed onto various surfaces, they render those surfaces odorous. For example, various odors can be absorbed onto the walls of refrigerators, food containers, countertops, ice chests, etc. Further, various body odors are detected when odorous compounds are released from the skin surface.

In U.S. Pat. No. 4,795,482 it is disclosed that zeolitic molecular sieves having a high $SiO_2/Al_2O_3$ ratio can be used to eliminate organic odors. The process described in the '482 patent involves contacting the odors with the molecular sieve. Thus, the molecular sieve can be incorporated into body powders, foot powders, sprays, hand creams etc. It has been found that these methods of contacting are not the best means for accomplishing odor removal. For example, use of a foot powder creates a powder problem owing to the lightweight nature of the molecular sieve. If a spray is used, clogging of the spray head usually occurs.

Applicants have found a means for conveniently delivering or applying the molecular sieve to a surface which contains odorous compounds. The process involves taking a porous article and soaking it with a slurry that contains the molecular sieve. This slurry containing porous solid article is now contacted with the surface leaving a layer of the slurry on the surface which when dried gives a layer of the molecular sieve. The molecular sieve can now adsorb various odors present on the surface and can be wiped or rinsed off when desired.

Applicant's process and article differ from what is disclosed in the art. For example, U.S. Pat. No. 4,826,497 discloses a fibrous article containing a crystalline siliceous molecular sieve. The molecular sieve is embedded in the fibrous article and is not released from the article. Instead, the article is used to absorb fluids and the molecular sieve adsorbs the odors in the fluids. In contrast to this, applicants use fibrous articles such as towelettes, to deliver or deposit the molecular sieve onto an odorous surface.

U.S. Pat. No. 4,462,981 discloses a cosmetic applicator for moisturizing and deodorizing the skin. The applicator contains emollients, absorbent agents, deodorizing agents and fragrances. It is mentioned that zeolites can be used to absorb water. In contrast, applicants use a hydrophobic zeolite for adsorbing odors. Such a use is not contemplated by the '987 patent.

SUMMARY OF THE INVENTION

As stated, this invention relates to a delivery system for applying a coating or layer of a crystalline odor absorbing zeolite onto a surface. Accordingly, one embodiment of the invention is a process for applying a layer of an odor adsorbing crystalline zeolitic molecular sieve onto an odor containing surface comprising contacting the surface with a porous article which has been impregnated with a slurry containing at least one zeolitic molecular sieve having a framework $SiO_2/Al_2O_3$ ratio of at least 18 to deposit a layer of the slurry onto said surface and drying the surface at ambient conditions to give a layer of the crystalline zeolitic molecular sieve on the surface.

Another embodiment of the invention is an article of manufacture suitable for applying a layer of a crystalline zeolitic molecular sieve onto a surface, the article comprising a porous material impregnated with a slurry comprising from about 48 wt % to about 68 wt % water, from about 15 wt % to about 25 wt % ethanol, from about 0.5 wt % to about 2.0 wt % of a suspending agent, from about 0.1 wt % to about 0.2 wt % of a preservative and from about 5.0 wt % to about 25.0 wt % of a crystalline zeolitic molecular sieve having a framework $SiO_2/Al_2O_3$ ratio of at least 18.

These and other objects and embodiments will become more evident after a detailed description of the invention.

DETAILED DESCRIPTION OF THE INVENTION

One component of the article of this invention is a porous article. This article acts as a carrier for the slurry which contains the molecular sieve. Any porous article which can hold the slurry and then give it up can be used. The article can be composed of natural or synthetic materials and can be woven or non-woven fibrous articles, open-cell foams etc. Specific examples of the articles which can be used include but are not limited to cotton or synthetic fibrous balls, towelettes, wipes, bandages, pads, synthetic foam or natural sponges.

Another component of the article of this invention is a slurry which contains as the principal active ingredient a zeolitic molecular sieve. The molecular sieves which can be used are the high-silica zeolites which are hydrophobic and in which at least about 90 and preferably at least 95 percent of the framework tetrahedral oxide units are $SiO_2$ tetrahedra and which have a sorptive capacity for water at 25° C. and 4.6 torr of less than about 10 weight per cent, preferably less than about 6 weight per cent. In the case of aluminosilicate molecular sieves, the framework $SiO_2/Al_2O_3$ ratio is at least 18 and is preferably at least 35. Molecular sieve zeolites having framework molar $Si/Al_2$ ratios of from 200 to 500 are particularly suitable. Many of the synthetic zeolites prepared using organic templating agents are readily produced in a highly siliceous form. In many instances the reaction mixtures can be especially free of aluminum-containing reagents. These zeolites are markedly organophilic and include ZSM-5 (U.S. Pat. No. 3,702,886); ZSM-11 (U.S. Pat. No. 3,709,979); ZSM-35 (U.S. Pat. No. 4,016,245); ZSM-23 (U.S. Pat. No. 4,076,842); and ZSM-38 (U.S. Pat. No. 4,046,859) to name only a few. It has been found that the silica molecular sieves known as silicalite and F-silicalite are particularly suitable for use in the present invention and are thus preferred. These materials are disclosed in U.S. Pat. No(s), 4,061,724 and 4,073,865, respectively. To the extent the aforesaid siliceous molecular sieves are synthesized to have $SiO_2/Al_2O_3$ ratios greater than 35, they are suitable for use in the present compositions without any additional treatment to increase their degree of hydrophobicity. Molecular sieves which cannot be directly synthesized to have both sufficiently high Si/Al and/or degree of hydrophobicity ratios can be subjected to dealumination techniques, fluorine treatments and the like, which result in organophilic zeolite products. High-temperature steaming procedures for treating zeolite Y which result in hydrophobic product forms are reported by P. K. Maher et al, "Molecular Sieve Zeolites," Advan. Chem. Ser. 101, American Chemical Society, Washington, D.C., 1971, p. 266. A more recently reported procedure applicable to zeolite species generally involves dealumination and the substitution of silicon into the dealuminated lattice site. This process is disclosed in U.S. Pat. No. 4,503,023. Halogen or halide compound treatments for zeolites to increase their hydrophobicity are disclosed in U.S. Pat. No(s). 4,569,833 and 4,297,335.

In the case of the aluminosilicates or silica polymorphs produced using large organic templating ions, such as tetraalkylammoniun ions, it is frequently necessary to remove charge-balancing organic ions and any occluded templating material in order to permit their use in adsorption processes.

It should be pointed out that with respect to the hydrophobic aluminosilicates it is the framework $SiO_2/Al_2O_3$ ratio which is important. This is not necessarily the same ratio as would be indicated by conventional wet chemical analysis. Especially is this the case when dealumination has been accomplished by high temperature steaming treatments wherein aluminum-containing tetrahedral units of the zeolite are destroyed, but the aluminum atoms remain, at least in part, in the zeolite crystals. For such zeolite products one must resort to other analytical methods such as X-ray and NMR in order to obtain the $SiO_2/Al_2O_3$ ratio. One such steam-treated zeolite Y composition, known in the art as LZ-10, has been found to be particularly useful in removing odors, especially when utilized in combination with the silica polymorph silicalite. The process for preparing LZ-10 is described in detail in U.S. Pat. No. 4,331,694.

A slurry is prepared by dispersing the desired zeolitic molecular sieve in water. It should be pointed out that slurry is a common term used to refer to a dispersion of a solid in a liquid. In order to maintain the desired zeolite particles dispersed or suspended in the water, a suspending agent is added to the slurry. These suspending agents include hydrophilic colloidal dispersions of clays and those polyelectrolytes which function primarily to lower the zeta potential of the dispersed phase and thus lessen the tendency of the molecular sieve particles to agglomerate and viscosity enhancers such as hydroxyethyl cellulose and carboxypolymethylene.

Preferred suspending agents are those swellable clays which make up the smectite group of clays. Smectite clays are magnesium aluminum silicate clays having a 2:1 layered structure. By a 2:1 layered structure is meant that the clay is made up of one layer of octahedrally coordinated cations which are linked through shared oxygens to two layers of tetrahedrally coordinated cations. Members of the smectite group of clays are montmorillonite, beidellite, nontronite, hectorite, saponite, Laponite® and sauconite. Laponite® is a synthetic form of hectorite manufactured by Laponite Co., and is preferred for preparing the zeolite slurry.

Another necessary component of the slurry is ethanol which acts as an astringent.

Since this slurry can be applied to human skin, it is necessary that the slurry contain an anti-microbial or preservative agent. It should be noted that not all such preservatives are compatible with the high-silica zeolites. It is believed that this incompatibility, i.e., ineffectiveness, is due, at least in part, to these substances being adsorbed into the internal pore system of the zeolite crystals and are thus limited in their contact with microorganisms present in the medium outside the zeolite particles. Accordingly, it is preferred to use as the preservative a quaternary ammonium salt which is large enough that it does not fit in the internal pore of the zeolite. Examples of such salts are 1-(3-chloro-2-propenyl)-3,5,7,triaza-1-azoniatricyclo (3.3.1.1[3,7]) decane chloride, N-dodecyl-ar-ethyl-N-N-dimethylbenzene-methanaminium chloride, etc.

The relative amounts of each components of the slurry can vary considerably but are usually within the following ranges:

| Component | Wt. % | Wt. % (Preferred) |
|---|---|---|
| Zeolite | 5.0 to 25.0 | 7.0 to 20 |
| Water | 48 to 68 | 53 to 63 |
| Ethanol | 15 to 25 | 17 to 22 |
| Suspending agent | 0.5 to 2.0 | 0.8 to 1.6 |
| Preservative | 0.1 to 0.3 | 0.1 to 0.2 |

Optionally, when the article is intended to be used on human skin an emollient can be included in the slurry which gives a "soft feel" to the slurry. Such emollients are well known in the art and include polyethylene glycol ether of methyl glucose, polyoxyethylene (75) lanolin, polyoxyethylene (20) oleyl ether, lanolin alcohol, glycerine, mineral oil, etc. The emollient is present from about 2 to about 10 wt %.

The slurry is prepared by means well known in the art such as blending all the components together. Although the order of addition is not critical, it is preferred to prepare the slurry as follows. The suspending agent is first added to the water followed by high shear mixing for a time of about 15 to about 30 minutes. Next the ethanol is added with mixing followed by addition of the zeolite. Finally, the preservative is added and the slurry stirred for an additional 5 to about 15 minutes.

Having formed the slurry it is applied to the porous article by conventional techniques such as soaking from about 3 minutes to about one hour.

The zeolite containing article described above is now used in a process to deposit a layer of the zeolitic molecular sieve onto a surface that contains odorous compounds. The process involves contacting the slurry containing article with the odorous surface. This is usually effected by wiping the surface with the slurry containing article and then letting the slurry dry under ambient conditions. Once the odors are removed, the zeolite layer can be removed by rinsing with water or wiping with a towel.

The slurry of this invention can be applied to various surfaces such as counter tops, storage containers, refrigerators, trash container and human or animal skin. The process of this invention is particularly suited for applying a zeolite layer to human feet in order to control foot odor. The advantage to the instant process is that the zeolite will adhere to the foot where it can best adsorb foot odors. In contrast using a dry powder, one usually applies the powder to the interior of the shoe where it is less effective. Even if one applies a powder to the feet, usually a smaller amount is applied than possible with the instant process owing to the fact that only a small amount of powder will adhere to the skin.

The instant process/article has a similar advantage in removing odors from trash cans, food containers, refrigerators, etc. That is, the zeolite will adhere to all the surfaces of the container and not collect at the bottom of the container. This allows the zeolite to remove odors from all the surfaces in a short amount of time.

The following examples are presented in illustration of the invention and are not intended as undue limitations in the generally broad scope of the invention as set out in the appended claims.

EXAMPLE 1

A slurry was prepared using the following components

| Component | Wt. % |
|---|---|
| Deionized water | 52.80 |
| Denatured Ethanol | 25.00 |
| Silicalite | 10.00 |
| *Laponite XLG ® | 2.00 |
| Glucam E-10 ® | 5.00 |
| Solulan L-575 ® | 4.00 |
| Ameroxal OE-20 ® | 1.00 |
| Dowicil ® 200 | 0.20 |

*Laponite XLG® is a laponite clay obtained from Southern Clay Products; Glucam E-10® is polyethylene glycol ether of methyl glucose obtained from Amerchol Corp; Solulan L-575® is polyoxyethylene (75) lanolin obtained from Amerchol Corp.; Ameroxal OE-20® is polyoxyethylene (20) oleyl ether obtained from Amerchol Corp. and Dowicil 200® is 1-(3-chloro-2-propenyl)-3,5,7-triaza-1-azoniatricyclo (3.3.1.1[3,7]) decane chloride obtained from Dow Chemical Corp.

The slurry was prepared by dispersing the Laponite XLG® in the water under high shear for 20 minutes. Next the ethanol was added and the mixture stirred for an additional 10 minutes at which point half of the silicalite was added and stirred for 10 minutes. In a separate container, the Glucam E-10®, Solulan L-575® and Ameroxal OE-20® were mixed together and then added to the water/zeolite slurry. To this resultant mixture the other half of the silicalite was added and the mixture stirred for 10 minutes. Finally the Dowicil®200 was added and the slurry stirred.

A towelette was soaked in the above slurry and used to wipe over human feet. As the slurry dried at ambient conditions, a fine layer of silicalite was deposited on the skin.

We claim as our invention:

1. An article of manufacture suitable for applying a layer of a crystalline zeolitic molecular sieve onto a surface, the article comprising a porous article impregnated with a slurry comprising from about 48 wt % to about 68 wt % water, from about 15 wt % to about 25 wt % ethanol, from about 0.5 wt % to about 2.0 wt % of a suspending agent, from about 0.1 wt % to about 0.3 wt % of a preservative and from about 5.0 wt % to about 25.0 wt % of a crystalline zeolitic molecular sieve having a framework $SiO_2/Al_2O_3$ ratio of at least 18.

2. The article of claim 1 where the porous article is selected from the group consisting of woven fibrous articles, non-woven fibrous articles and open-cell foams.

3. The article of claim 2 where the porous article is selected from the group consisting of cotton balls, synthetic fibrous balls, towelettes, wipes, bandages, pads, synthetic foams and natural sponges.

4. The article of claim 1 where the preservative is 1-(3-chloro-2-propenyl-3, 5, 7-triaza-1-azoniatricyclo (3.3.1.1. [3,7]) decane chloride.

5. The article of claim 1 where the suspending agent is a swellable clay selected from the group consisting of montmorillonite, beidelite, nontronite, hectorite, saponite and sauconite.

6. The article of claim 1 further characterized in that it contains from about 2 wt % to about 10 wt % of an emollient.

7. The article of claim 6 where the emollient is selected from the group consisting of polyethylene glycol ether of methyl glucose, polyoxyethylene (85) lanolin, polyoxyethylene (20) oleyl ether, lanolin alcohol, glycerine and mineral oil.

* * * * *